United States Patent [19]

Scott

[11] 4,125,572

[45] Nov. 14, 1978

[54] THERMOPLASTIC MOLDING COMPOSITION

[75] Inventor: Steven W. Scott, Evansville, Ind.

[73] Assignee: General Electric Company, Pittsfield, Mass.

[21] Appl. No.: 750,557

[22] Filed: Dec. 14, 1976

[51] Int. Cl.² ............................................. C08L 67/02
[52] U.S. Cl. ................................. 260/860; 260/40 R; 528/307; 528/306; 528/196
[58] Field of Search ................... 260/860, 75 R, 40 R

[56] References Cited

U.S. PATENT DOCUMENTS

| 3,131,148 | 4/1964 | Taulli | 260/40 R |
| 3,931,094 | 1/1976 | Segal et al. | 260/40 R |
| 3,950,301 | 4/1976 | Balog et al. | 260/40 R |
| 3,953,394 | 4/1976 | Fox et al. | 260/40 R |

Primary Examiner—Lorenzo B. Hayes
Assistant Examiner—Amelia B. Yarbrough
Attorney, Agent, or Firm—Myron B. Kapustij; William F. Mufatti

[57] ABSTRACT

A thermoplastic molding composition comprising a polycarbonate, a poly(1,4-butylene terephthalate) and a copolyester of an aliphatic or cycloaliphatic diol and a mixture of terephthalic and isophthalic acids.

13 Claims, No Drawings

THERMOPLASTIC MOLDING COMPOSITION

This invention is concerned with a thermoplastic molding composition. More particularly, it relates to a blend of a polycarbonate, a poly(1,4-butylene terephthalate) and a copolyester of an aliphatic or a cycloaliphatic diol and a mixture of terephthalic and isophthalic acids. This composition can additionally contain a reinforcing amount of a reinforcing filler.

BACKGROUND OF THE INVENTION

Poly(1,4-butylene terephthalate) resins are well known and have been widely employed for the production of thermoplastic molded articles. Poly(1,4-butylene terephthalate) has a good processability, strength and toughness. Other key properties include low water absorption resulting in good dimensional stability, low static and dynamic coefficients of friction, good chemical and abrasion resistance, and good electrical properties.

Polycarbonates are well known and have been widely employed for the production of thermoplastic molded articles.

Polycarbonate is a high-performance plastic with good impact strength. In addition to ductility (impact strength), general-purpose polycarbonate has high transparency, wide temperature limits (high impact resistance below −60° C. and a UL thermal endurance rating of 115° C. with impact), good dimensional stability, high creep resistance and electrical properties which qualify it as sole support for current carrying parts (up to 125° C. without loss of impact strength). Polycarbonate has good stain resistance and a wide range of colorability.

U.S. Pat. No. 3,218,372, which is incorporated by reference, describes compositions of polyalkylene terephthalate and polycarbonate resins. These compositions are described as having a lower melt viscosity as compared with polycarbonate when used alone. Also, this composition is described as having a higher ductility than in the case of the use of polyalkylene terephthalate singly.

However, blends of polycarbonate and polyalkylene terephthalate and particularly poly(1,4-butylene terephthalate) tend to lose their transparency when the composition contains more than about 10% poly(1,4-butylene terephthalate). Transparency is important when compositions of polycarbonate and poly(1,4-butylene terephthalate) are used in packaging applications such as for milk and water bottles. Also, blends of polycarbonate and poly(1,4-butylene terephthalate) lose their optical clarity upon heat aging.

DESCRIPTION OF THE INVENTION

It has been discovered that by adding a copolyester of an aliphatic or cycloaliphatic diol and a mixture of terephthalic and isophthalic acids, to a polycarbonate resin and a poly(1,4-butylene terephthalate) resin, an article molded from this composition has optical clarity and retains its clarity on heat aging. Also, such a composition has good moisture barrier properties which makes it suitable for packaging applications such as for water and milk bottles.

The instant molding composition comprises
(a) a polycarbonate resin;
(b) poly(1,4-butylene terephthalate);
(c) a copolyester of an aliphatic or cycloaliphatic diol and a mixture of terephthalic and isophthalic acids.

The polycarbonate resin has recurring units of the formula:

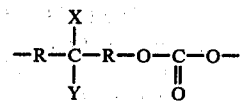

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

Also, included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

The preferred polycarbonate resins may be derived from the reaction of bisphenol-A and phosgene. These polycarbonates have from 10–400 recurring units of the formula:

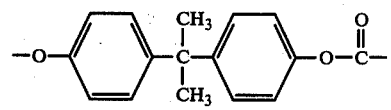

The polycarbonates are described in U.S. Pat. Nos. 3,028,365; 3,334,154 and 3,915,926 all of which are incorporated by reference. The polycarbonate should have an intrinsic viscosity between 0.3 and 1.0, preferably from 0.45 to 0.70 as measured at 20° C. in methylene chloride.

The poly(1,4-butylene terephthalate) resin is a high molecular weight, polymeric 1,4-butylene glycol terephthalate having repeating units of the formula:

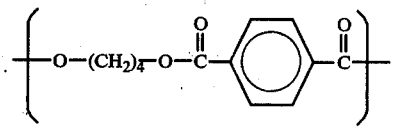

It can be prepared by following the teachings of U.S. Pat. No. 2,465,319 and U.S. Pat. No. 3,047,539, for example. Poly(1,4-butylene terephthalate) is also available commercially.

These poly 1,4-butylene glycol terephthalates have an intrinsic viscosity of at least 0.4 and preferably about 0.7 deciliters/gram as measured in o-chlorophenol, a 60/40 phenol/tetrachloroethane mixture or a similar solvent at 25°–30° C. The upper limit is not critical, but it will generally be about 2.5 dl./g. Especially preferred polyesters will have an intrinsic viscosity in the range of 0.7 to 1.3 dl./g.

The copolyester component (c) can be prepared from an aliphatic or cycloaliphatic diol and a mixture of terephthalic and isophthalic acids.

The aliphatic diols contain 2 to 18 and preferably 2 to 12 carbon atoms. Examples of aliphatic diols which can be used herein include ethylene glycol, 1,2-propanediol, 1,3-propanediol, 1,2-butanediol, 2,3-butanediol, 1,3-butanediol, 1,4-butanediol, 2,2-dimethyl-1,3-propanediol, 2,3-propanediol, 1,6-hexanediol, 2-ethylhexanediol-1,3. The preferred aliphatic diol is 1,4-butanediol.

The cycloaliphatic diols contain 6 to 18 carbon atoms. These diols include 1,2-cyclohexanediol, 1,4-cyclohexanediol and 1,4-cyclohexanedimethanol. These cycloaliphatic diols can be employed in their cis or trans configuration or as a mixture of both forms. The preferred cycloaliphatic diol is 1,4-cyclohexanedimethanol.

The mixture of terephthalic and isophthalic acids contains at least 5 mole percent of isophthalic acid and up to 99 mole percent of isophthalic acid.

This mixture of terephthalic and isophthalic acids may also contain minor amounts, e.g., from about 0.5 to about 2% by weight of aliphatic or aromatic dicarboxylic acids. The aliphatic dicarboxylic acids can contain up to about 50 carbon atoms. including cycloaliphatic, straight and branched chain acids, such as adipic acid, cyclohexanediacetic acid, dimerized $C_{16}$–$C_{18}$ unsaturated acids (which have 32 to 36 carbon atoms), trimerized such acids, and the like. The aromatic dicarboxylic acids can contain up to about 36 carbon atoms, hexahydroterephthalic acid, tetrahydrophthalic acid, hexahydrophthalic acid, hexahydroisophthalic acid, as well as endomethylene- and endoethylene-tetrahydrophthalic acid, hexachloroendomethylenetetrahydrophthalic acid or tetrabromophthalic acid. These copolyesters are prepared by methods known in the art as in U.S. Pat. Nos. 2,465,319; 2,901,466, and 3,047,539, for example.

The preferred copolyesters are poly(1,4-cyclohexanedimethanol terephthalate-co-isophthalate) and poly(1,4-butylene terephthalate-co-isophthalate). These copolyesters are commercially available.

The copolyesters should have an intrinsic viscosity between 0.30 and 2.0 dl./g. measured in a 60/40 phenol/tetrachloroethane solution or a similar solvent at 25°–30° C. Especially preferred copolyesters will have an intrinsic viscosity in the range of between 0.40 and 1.2 dl./g.

The polycarbonate resin, poly(1,4-butylene terephthalate) and copolyester are combinable with each other in all proportions. Preferably, the polycarbonate resin is used in amounts of from 40 to 95 parts by weight while the poly(1,4-butylene terephthalate) is used in amounts of from 5 to 60 parts by weight. The copolyester is used in amounts of 1 to 60 parts by weight of the combined weight of polycarbonate resin and poly(1,4-butylene terephthalate). Preferably, the copolyester is used in amounts of from 5 to 40 parts by weight of the combined weight of polycarbonate resin and poly(1,4-butylene terephthalate).

In a preferred embodiment of this invention, the molding composition comprises:

(a) a polycarbonate resin;
(b) poly(1,4-butylene terephthalate);
(c) a copolyester of an aliphatic or cycloaliphatic diol and a mixture of terephthalic and isophthalic acids; and
(d) a reinforcing amount of a reinforcing filler.

The reinforcing agents may be selected from finely divided aluminum, iron or nickel and the like, metal oxides and non-metals, such as carbon filaments, silicates, such as mica, aluminum silicate (clay), talc, asbestos, titanium dioxide, Wollastonite, Novaculite, potassium titanate and titanate whiskers, glass flakes, glass beads and fibers, and polymeric fibers and combinations thereof.

Although it is only necessary to use a reinforcing amount of the reinforcing agent, from 1–60 parts by weight of the total weight of the composition may comprise the reinforcing agent. A preferred range is from 5–50 parts by weight.

The preferred reinforcing agents are of glass, and it is preferred to use fibrous glass filaments, mixtures of glass and talc, glass and mica, glass and aluminum silicate, for example. The preferred filaments for plastics reinforcement are made by mechanical pulling. The glass filament diameters range from about 0.00012 to about 0.00075 inch, but this is not critical to the present invention.

The instant composition may be prepared by conventional techniques. One convenient method comprises blending the polyesters in powder or granular form, extruding the blend and comminuting into pellets or other suitable shapes.

The reinforcements are added in any usual manner, i.e., by dry blending or mixing or by mixing in the melted state in an extruder, or a heated mill or in other mixers.

Obviously, other materials can also be employed with the composition of this invention and include such materials as anti-static agents, pigments, mold release agents, thermal stabilizers, flame retardants, impact modifiers, extenders, UV stabilizers, nucleating agents and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

The following ingredients are dried:
polycarbonate resin[1]
poly(1,4-butylene terephthalate)[2]
poly(1,4-butylene terephthalate-co-isophthalate)[3]
poly(1,4-cyclohexane dimethanol terephthalate-co-isophthalate)[4]

[1] Lexan 154 (General Electric Co.)
[2] Valox 310 (General Electric Co.)
[3] Vituf 4444 (Goodyear Rubber Co.)
[4] Kodar A150 (Eastman Kodak Co.)

The blends are compounded in an extruder at 540° F. The extrudate is pelletized and the pellets are injection molded at 550° F. into ASTM type test bars in a standard machine. The test bars are tested for the following physical properties: Gardner Impact; Light Transmission of a ⅛"molded part. This is measured in a Gardner XL10A Colorimeter, CIE-Y value using Illuminant A.

The formulations are set forth below, while the results are set forth in Table I.

| | A | B | C | D | E | F | G | H | I | J |
|---|---|---|---|---|---|---|---|---|---|---|
| polycarbonate resin | 100 | 90 | 80 | 75 | 50 | 80 | 80 | 80 | 70 | 50 |
| poly(1,4-butylene terephthalate) | — | 10 | 20 | 25 | 50 | 10 | 13 | 15 | 20 | 30 |
| poly(1,4-butylene terephthalate-co-isophthalate) | — | — | — | — | — | 10 | 7 | — | — | — |
| poly(1,4-chclohexane dimethanol terephthalate-co-isophthalate) | — | — | — | — | — | — | — | 5 | 10 | 20 |

Table I

| | A | B | C | D | E | F | G | H | I | J |
|---|---|---|---|---|---|---|---|---|---|---|
| Transmission (%) | 87 | 85 | 62 | 39 | 0.5 | 83 | 84 | 83 | 60 | 55 |
| Impact (in./lbs.) | >480 | >480 | >480 | >480 | >480 | >480 | >480 | >480 | >480 | >480 |

It can be seen from Table I that the compositions of the instant invention improves the clarity of polycarbonate resin and poly(1,4-butylene terephthalate) blends as shown by the higher percent light transmission values, while maintaining the impact strength.

EXAMPLE 2

Example 1 is repeated with the exception that the ⅛ inch molded part is measured for light transmission as in Example 1 and also for light transmission after heat aging the sample for 24 hours at 125° C. The formulations are set forth below, while the results are set forth in Table II.

| | K | L | M | N | O |
|---|---|---|---|---|---|
| polycarbonate resin | 80 | 75 | 80 | 80 | 70 |
| poly(1,4-butylene terephthalate) | 20 | 25 | 10 | 13 | 20 |
| poly(1,4-butylene terephthalate-co-isophthalate) | — | — | 10 | 7 | — |
| poly(1,4-cyclohexane dimethanol terephthalate-co-isophthalate | — | — | — | — | 10 |

Table II

| | K | L | M | N | O |
|---|---|---|---|---|---|
| Transmission (%) | 62 | 39 | 83 | 84 | 60 |
| Transmission after heat aging, (%) | 29 | 4 | 80 | 81 | 54 |

It can be seen from Table II that the compositions of the instant invention retain their clarity after heat aging as shown by the higher percent light transmission values, as compared to a blend of polycarbonate and poly(1,4-butylene terephthalate).

EXAMPLE 3

Example 1 is repeated with the exception that the sample is measured for water vapor transmission rate according to ASTM E96-66. The formulations are set forth below, while the results are set forth in Table III.

| | P | Q | R | S | T | O |
|---|---|---|---|---|---|---|
| polycarbonate resin | 100 | 80 | 75 | 80 | 80 | 80 |
| poly(1,4-butylene terephthalate) | — | 20 | 25 | 10 | 13 | 15 |
| poly(1,4-butylene terephthalate-co-isophthalate) | — | — | — | 10 | 7 | — |
| poly(1,4-cyclohexane dimethanol terephthalate-co-isophthalate) | — | — | — | — | — | 5 |

Table III

| | P | Q | R | S | T | U |
|---|---|---|---|---|---|---|
| Water vapor transmission rate, gm-mil/100 in$^2$ - 24 hr-atm. | 9.5 | 5.3 | 5.0 | 5.5 | 5.3 | 6.2 |

It can be seen from Table III that the instant composition has improved moisture barrier properties as shown by the lower water vapor transmission rate as compared with polycarbonate alone.

EXAMPLE 4

The following ingredients are dried:
polycarbonate resin, as in Example 1;
poly(1,4-butylene terephthalate), as in Example 1;
poly(1,4-butylene terephthalate-co-isophthalate), as in Example 1.

The blends are compounded as in Example 1. The extrudate was pelletized and the pelletized compositions were extrusion blow molded into 7 ounch shampoo bottles weighing about 18.5 grams. These bottles were then filled with standard baby shampoo. These filled bottles were stored for one year at 77° F. and an atmosphere of 50% relative humidity. These samples are then evaluated for weight loss. The formulations are set forth below, while the results are set forth in Table IV.

| | W | X |
|---|---|---|
| polycarbonate resin | 100 | 80 |
| poly(1,4-butylene terephthalate) | — | 13 |
| poly(1,4-butylene terephthalate-co-isophthalate) | — | 7 |

Table IV

| | W | X |
|---|---|---|
| Weight loss (%) | 9.6 | 5.7 |

The data in Table IV shows that the composition of the instant invention produces a bottle which has improved barrier properties, as shown by the smaller weight loss, than a bottle produced from polycarbonate resin. Also, the bottle molded from the instant composition retained its optical clarity.

Although the above examples have shown various modifications of the present invention, other variations are possible in the light of the above teachings. It is, therefore, to be understood that changes may be made in the particular embodiments of the invention described which are within the full intended scope of the invention as defined by the appended claims.

What is claimed is:

1. A thermoplastic molding composition which consists essentially of:
   (i) from about 40 to about 95 parts by weight of a polycarbonate resin; and
   (ii) a polyester consisting of
   (a) from about 5 to about 60 parts by weight of poly(1,4-butylene terephthalate) and
   (b) from about 1 to about 60 parts by weight, based on the combined weight of (i) and (a), of a copolyester of an aliphatic diol containing 2 to 18 carbon atoms or cycloaliphatic diol containing 6 to 18 carbon atoms and a mixture of terephthalic and isophthalic acids.

2. A thermoplastic molding composition as defined in claim 1 wherein the polycarbonate has recurring units of the formula:

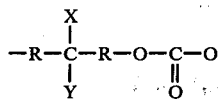

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together and with the adjoining

atom form a cycloalkane radical, the total number of carbon atoms in X and Y being up to 12.

3. A thermoplastic molding composition as defined in claim 2 wherein the polycarbonate has the repeating unit

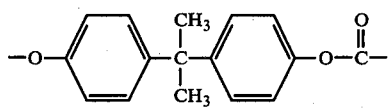

4. A thermoplastic molding composition as defined in claim 1 wherein the copolyester is of a 1,4-cyclohexane dimethanol and a mixture of terephthalic acid and isophthalic acid.

5. A thermoplastic molding composition as defined in claim 1 wherein the copolyester is of 1,4-butanediol and a mixture of terephthalic acid and isophthalic acid.

6. A reinforced thermoplastic molding composition which consists essentially of:
   (i) from about 40 to about 95 parts by weight of a polycarbonate resin;
   (ii) a polyester consisting of
   (a) from about 5 to about 60 parts by weight of poly(1,4-butylene terephthalate) and
   (b) from about 1 to 60 parts by weight, based on the combined weight of (i) and (a) of a copolyester of an aliphatic diol containing 2 to 18 carbon atoms or cycloaliphatic diol containing 6 to 18 carbon atoms or cycloaliphatic diol containing 6 to 18 carbon atoms and a mixture of terephthalic and isophthalic acids; and
   (iii) from about 1 to about 60 parts by weight, based on the combined weight of (i), (a) and (b), of a reinforcing filler.

7. A reinforced thermoplastic molding composition as defined in claim 6 wherein the polycarbonate has recurring units of the formula:

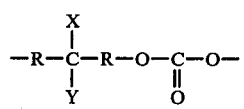

wherein each —R— is selected from the group consisting of phenylene, halo-substituted phenylene and alkyl substituted phenylene and X and Y are each selected from the group consisting of hydrogen, hydrocarbon radicals free from aliphatic unsaturation and of radicals which together with the adjoining

atom from a cycloalkane radical, the total number of carbon atoms in X and Y being up to 12.

8. A reinforced thermoplastic molding composition as defined in claim 7 wherein the polycarbonate has the repeating unit

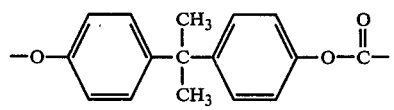

9. A reinforced thermoplastic molding composition as defined in claim 1 wherein the copolyester is of a 1,4-cyclohexane dimethanol and a mixture of terephthalic acid and isophthalic acid.

10. A reinforced thermoplastic molding composition as defined in claim 1 wherein the copolyester is of 1,4-butanediol and a mixture of terephthalic acid and isophthalic acid.

11. A reinforced thermoplastic molding composition as defined in claim 10 wherein the reinforcing filler is glass fiber.

12. A reinforced thermoplastic molding composition as defined in claim 10 wherein the reinforcing filler is glass and mica.

13. A reinforced thermoplastic molding composition as defined in claim 10 wherein the reinforcing filler is glass and talc.

* * * * *